3,374,273
FLUORO COMPOUNDS AND SYNTHESIS THEREOF
William J. Cunningham, Somerset, and Cyril Woolf, Morris Township, Morris County, N.J., assignors to Allied Chemical Corporation, New York, N.Y., a corporation of New York
No Drawing. Continuation-in-part of application Ser. No. 297,220, July 24, 1963. This application Oct. 31, 1966, Ser. No. 591,034
4 Claims. (Cl. 260—593)

This application is a continuation-in-part of our copending application, Ser. No. 297,220, filed July 24, 1963, now abandoned which latter application is, in turn, a continuation-in-part application of our copending application Ser. No. 263,430, filed Mar. 7, 1963, now abandoned.

This invention relates to the monohydrate of $$CF_3COCF_2Cl$$

and to a process for converting monohydrates of both $CF_3COCF_2Cl$ and $CF_3COCF_3$ to constant boiling compositions of these fluorinated ketones with water, corresponding to $CF_3COCF_2Cl \cdot 3H_2O$ and $CF_3COCF_3 \cdot 3H_2O$, respectively.

Hexafluoroacetone, $CF_3COCF_3$, is a known compound made by known processes, and is of known utility, e.g., it has been used to prepare the hexafluoro-bisphenol A compound

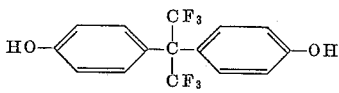

which has been converted to fluorine-containing polycarbonate resin. Likewise, pentafluorochloroacetone $$CF_3COCF_2Cl$$

is a known compound made by known processes, and is of known utility such as when hydrolyzed by treatment with strong alkali at moderately low temperatures yields the alkali metal salt of trifluoroacetic acid which when acidified with sulfuric acid produces $CF_3COOH$, a commercial product.

Under normal conditions, $CF_3COCF_3$ is a gaseous compound having a boiling point of minus 27° C. and a melting point of about minus 129° C., and $CF_3COCF_2Cl$ is a gaseous compound having a boiling point of plus 8° C. and a melting point of minus 133° C. Storage and shipment of $CF_3COCF_2Cl$ and $CF_3COCF_3$ may be made, as is, with compressed gas equipment, or, as will be described in more detail hereafter, as solid or liquid hydrate, in which form they are more easily handleable.

An object of this invention is to provide a solid hydrate form of $CF_3COCF_2Cl$.

Another object of the invention is to provide a method for converting the solid monohydrates of $CF_3COCF_2Cl$ and $CF_3COCF_3$ to liquid, constant boiling compositions corresponding to $CF_3COCF_2Cl \cdot 3H_2O$ and $$CF_3COCF_3 \cdot 3H_2O$$

respectively.

Other objects and advantages of the invention will become apparent from the following description.

$CF_3COCF_3 \cdot 3H_2O$ is a constant boiling, water-white liquid at atmospheric pressure, boiling at about 105° C. It has been reported in the literature as a hydrate of $CF_3COCF_3$. A. T. Morse et al. in Canadian Journal of Chemistry, vol. 33, No. 3 (March 1955), p. 456, disclose it as "hexafluoroacetone hydrate, B.P. 55–6° C. at 80 mm." Chemical Abstracts, vol. 54 (1960), 20841a, discloses it as "perfluoroacetone hydrate, $b_{90}50°$." Henne et al., in Journal of the American Chemical Society, vol. 72 (1950), p. 3578, disclose it as $CF_3COCF_3$ hydrate, B.P. 57° at 93 mm.

Strictly speaking, a hydrate is a true compound. The art has, however, used this term loosely to describe compositions which are not true compounds but which behave in some respects as true compounds, such as by exhibiting a constant boiling point.

$CF_3COCF_3 \cdot 3H_2O$ exhibits many properties characteristic of a true compound. Recent study of the freezing characteristics of this composition has, however, indicated that $CF_3COCF_3 \cdot 3H_2O$ is in fact not a true compound but is a constant boiling distillable mixture satisfying the empirical formula $CF_3COCF_3 \cdot 3H_2O$. To facilitate expression and to be consistent with the prior art terminology for the constant boiling mixture of $CF_3COCF_3$, and three (3) moles of $H_2O$, this composition will be referred to herein as a hydrate and, more particularly, as the trihydrate of $CF_3COCF_3$.

$CF_3COCF_2Cl \cdot 3H_2O$ is a constant boiling, water-white liquid at atmospheric pressure, boiling at about 105° C. and also will be referred to as a hydrate.

In the forms of the trihydrates, each of $CF_3COCF_2Cl$ and $CF_3COCF_3$ may be stored, shipped, piped, pumped and otherwise handled as conveniently as water. At the point of ultimate use each of the fluorinated ketones may be recovered in substantially pure form from the trihydrates by economical procedures. Further, each of these fluorinated ketones may be converted to the corresponding monohydrate by conveniently practicable procedure. The $CF_3COCF_3 \cdot H_2O$ is a white crystalline solid having a melting point of about 40° C., and the $$CF_3COCF_2Cl \cdot H_2O$$

is a similar white crystalline solid having a melting point of 26.0–26.5° C. In the forms of the solids, the ketones may be stored and shipped in conventional containers. As described below, at point of use, each of the ketones may be recovered in substantially pure form from the monohydrates.

In the following specification and claims, the terms "fluorinated ketone," "ketone" and "FK," unless otherwise modified, define material selected from the group consisting of $CF_3COCF_2Cl$ and $CF_3COCF_3$.

The FK hydrates may be prepared by contacting, preferably as sole reactants, FK with liquid-phase water in amount equivalent to at least one mol of $H_2O$ per mol of FK, while in a reaction medium preferably consisting of FK and water, and while maintaining temperatures such that any free water present is in liquid phase, and recovering from the resulting reaction mass FK. $xH_2O$ where $x$ is a whole odd number from one to 3, specific manner of hydrate recovery being dependent largely upon the relative amounts of FK and water in any given reaction medium or other liquor, and upon the specific sought-for product.

$FK \cdot H_2O$ may be prepared by introducing the required amount of FK into the amount of water required to form the monohydrate. When FK is introduced into liquid water, reaction between FK and $H_2O$ takes place and continues until the amount of FK charged is slightly more than equivalent to about one mol proportion of FK per mol of $H_2O$ charged. Thereafter any further quantity of FK introduced passes off as an unreacted gas. At this stage, if reaction temperature is held appreciably below about the melting point of the $FK \cdot H_2O$ (about 40° C. in the case of $CF_3COCF_3 \cdot H_2O$ and about 26.0–26.5° C. in the case of $CF_3COCF_2Cl$) there is formed in the contacting vessel a somewhat moist but relatively solid mass of relatively long, needle-like crystals of FK monohydrate. Reaction temperature may be controlled by regulation of rate of introduction of FK into the water or by other suitable means. The $FK \cdot H_2O$ material, thus produced, is sufficiently pure for the purposes of storage and shipping. If a more purified product is desired, the material may be gently heated just below or about its melting point to dry off the slight excess of ketone. At a point of ultimate use, the solid FK·H₂O may be dehydrated to pure FK with a desiccant such as conc. H₂SO₄ or P₂O₅, or it may be added to enough water to form the corresponding liquid FK·3H₂O which in turn may be dehydrated, if desired, in a similar fashion to recover corresponding pure FK.

According to the invention process, it has been found that FK·3H₂O may be formed from a mass containing FK and less than a 3:1 proportion of water to FK. This phase of the invention is based on the facts that FK·3H₂O boils constantly at about 105° C., and that FK, on heating, disassociates to FK and FK·3H₂O in accordance with $$3FK \cdot H_2O \rightarrow 2FK + FK \cdot 3H_2O$$

In accordance with the invention, FK·3H₂O may be recovered from substantially solid and/or liquid FK·H₂O. To effect recovery of FK·3H₂O, the FK·H₂O may be placed in an ordinary heating pot or vessel. On application of heat to the pot, the FK·H₂O, if initially solid, melts. On further heating and raising of temperature, FK is evolved, and on continued heating at temperature and for a time interval enough to vaporize all constituents boiling at temperature below about 105° C., there remains in the pot a solution constantly boiling at about 105° C. and consisting of liquid FK·3H₂O.

The following illustrate practice of the invention.

EXAMPLE 1

Apparatus employed included a single-necked flask provided with a magnetic stirrer, and at the top of the neck with a Dry Ice-acetone cold finger. Incoming reactants charged consisted of water and CF₃COCF₃. About 92.5 g. (5.144 m.) of water were introduced into the flask. With constant stirring of flask contents, vaporous CF₃COCF₃ was fed into the cold finger in which $$CF_3COCF_3$$

condensed and then dropped as liquid into the water. During a period of about 6 hrs., about 577 g. (3.48 m.) of CF₃COCF₃ were thus fed into the flask, and were absorbed in the water. During addition of the CF₃COCF₃, the contents of the flask warmed up to about 40° C. At this stage, the flask contained about 680 g. of liquid material, and mol ratio of CF₃COCF₃ to H₂O of such material was about 1:1.48. The contents of the flask were split into two approximately equal increments each containing about 1.74 m. of CF₃COCF₃ and about 2.57 m. of H₂O. To a first increment of about 344 g. in a suitable flask equipped with a cold finger, an additional 157 g. (0.95 m.) of CF₃COCF₃ were added in the manner described above, at which point no more CF₃COCF₃ was absorbed. Temperature in the flask was about 15-30° C. Contents of the flask comprised a slightly moist mass composed of long, needle-like white solid crystals containing CF₃COCF₃ and H₂O constituents in mol ratio of about 2.69 to about 2.57, and having a melting point of about 40° C., and constituting the monohydrate $$CF_3COCF_3 \cdot H_2O$$

The neck of the flask was connected to a distillation column having a cooled head. On heating the contents of the flask gradually up to a pot temperature a little below about 105° C., the solids melted at about 40° C. and there was distilled over a gas which, when condensed in a Dry Ice trap, amounted to about 196 g. (1.18 m.) of water white liquid. The gas discharged from the distillation column during distillation was subjected to infrared analysis which showed the C=O group and otherwise the known pattern of CF₃COCF₃. Condensate, resulting from cooling of the gas, was distilled in a separate operation and found to have the minus 27° C. B.P. of anhydrous CF₃COCF₃.

When discharge of gas, identified to be CF₃COCF₃, from the top of the distillation column ceased, the latter was put on reflux maintained at 105° C. On take-off of product from the column, temperature including pot temperature remained at about 105° C. over the entire distillation operation to a substantially dry and empty pot. During distillation there was produced an off-gas which when condensed at about room temperature amounted to about 146 g. (0.65 m.) of water white liquid. The latter was analyzed by nuclear magnetic resonance and was found to contain 52.95% (by weight) of fluorine and 2.68% of hydrogen, corresponding theoretical values for CF₃COCF₃·3H₂O being 51.8% and 2.73%. The found values indicate about 71.1% hexafluoroacetone and 24.1% H₂O as compared with theory values of about 75.5% and 24.5% respectively. In the formula $$CF_3COCF_3 \cdot xH_2O$$

$x$ calculated on the basis of hydrogen analytical result equals 2.92 m., and $x$ calculated on the basis of the fluorine result equals 2.73 m. Infrared absorption spectrum showed the presence of fluorine atoms and the presence of hydroxyl group. Phase studies of this material showed that it was not a true compound, but a constant boiling composition corresponding to CF₃COCF₃·3H₂O. Hexafluoroacetone was quantitatively recovered from this composition by distilling a sample of the product in the presence of concentrated sulfuric acid. Accordingly, on heating the substantially solid crystalline monohydrate, CF₃COCF₃·H₂O, disassociated to CF₃COCF₃ and $$CF_3COCF_3 \cdot 3H_2O$$

Under normal conditions the latter is a water-white liquid having a constant boiling point of about 105° C. and a specific gravity at 25° C. of about 1.6.

EXAMPLE 2

About 195 g. of CF₃COCF₂Cl were condensed into a flask cooled in a Dry Ice-acetone slush. About 18 g. of water were added gradually to the CF₃COCF₂Cl. On completion of water addition, during which temperature was a little above zero, there was formed in the flask a slightly moist mass composed of white solid crystals containing CF₃COCF₂Cl and H₂O constituents in mol ratio of 1.07 to one, i.e., corresponding substantially to the monohydrate, CF₃COCF₂Cl·H₂O. This material was found to have a melting point of 26.0–26.5° C. The neck of the flask was connected to a distillation column having a cooled head. On heating up the flask contents to a little below about 105° C., the solids melted at a little above 26–27° C., and there was distilled over a gas which, when condensed in a Dry-Ice trap amounted to about 112 g. of water-white liquid. Infrared analysis of the latter showed the C=O group and otherwise known pattern of CF₃COCF₂Cl, and the material boiled at the plus 8° C. B.P. of anhydrous CF₃COCF₂Cl. When discharge of gas from the top of the distillation column ceased, the latter was put on reflux maintained at about 105–106° C. On take-off of further vaporous product from the column, temperature including pot temperature remained at about 105–106° C. during distillation to a substantially dry and empty pot. In the course of distillation, there was produced an off-gas which, when condensed to about room temperature, amounted to about 81 g. of water-white liquid. On the basis that initial addition of water to the CF₃COCF₂Cl formed CF₃COCF₂Cl·H₂O, and that during heating and distillation of the solid material the CF₃COCF₂Cl·H₂O was disassociated to CF₃COCF₂Cl and CF₃COCF₂Cl·3H₂O, recovery of 112 g. of CF₃COCF₂Cl compares with theoretical 121 g. recovery of $$CF_3COCF_2Cl$$

indicating a ketone loss. On basis of the water charged, the 105–106° C. constant boiling liquor corresponded to CF₃COCF₂Cl·2.8H₂O. Instrumental NMR analysis of the constant boiling liquor for fluorine showed 39.8% by weight as compared with the 40.2% theory for $$CF_3COCF_2Cl \cdot 3H_2O$$

Based on material balance, fluorine analysis, and phase studies, the final condensate was established not to be a true compound but a constant boiling composition corresponding to $CF_3COCF_2Cl \cdot 3H_2O$. The composition has a specific gravity at 25° C. of about 1.63.

EXAMPLE 3

About 23.5 g. (0.1 m.) of $CF_3COCF_2Cl \cdot 3H_2O$, B.P. 105° C., prepared as described in Example 2, were introduced into a flask cooled in wet ice. About 41 g. (0.23 m.) of gaseous $CF_3COCF_2Cl$ were bubbled into the liquid trihydrate. On cessation of feed of $CF_3COCF_2Cl$, the contents of the flask comprised a slightly moist mass containing $CF_3COCF_2Cl$ and $H_2O$ constituents in mol ratio of 0.33:0.30. The resulting mass was heated gently at less than about 30° C., and there were vaporized off and recovered about 7.5 g. of material identified by infrared to be $CF_3COCF_2Cl$. The residue recovered in the flask was a relatively dry white crystalline solid material in amount of 57 g. corresponding to about 60 g. of $$CF_3COCF_2Cl \cdot H_2O$$

theoretically recoverable as $CF_3COCF_2Cl \cdot H_2O$. Melting point of the solid material was determined to be about 26.5° C. Infrared absorption spectrum analysis showed the presence of fluorine atoms and the presence of a relatively narrow 0.1 micron hydroxyl absorption in the 3 micron range. The material absorbs at 9.4 microns as compared with the 9.24 microns of the three water hydrate of Examples 3–5. Infrared analysis, material balance and phase studies establish the product to be $$CF_3COCF_2Cl \cdot H_2O$$

We claim:
1. The process for making a hydrate selected from the group consisting of $CF_3COCF_3 \cdot 3H_2O$ and

$$CF_3COCF_2Cl \cdot 3H_2O$$

comprising heating a corresponding compound selected from the group consisting of $CF_3COCF_3 \cdot H_2O$ and $$CF_3COCF_2Cl \cdot H_2O$$

to volatilize therefrom volatile constituents which boil below about 105° C. at atmospheric pressure to thereby form a liquid hydrate selected from the group consisting of $CF_3COCF_3 \cdot 3H_2O$ and $CF_3COCF_2Cl \cdot 3H_2O$ boiling constantly at about 105° C. at atmospheric pressure, and thereafter recovering a hydrate selected from the group consisting of $CF_3COCF_3 \cdot 3H_2O$ and $CF_3COCF_2Cl \cdot 3H_2O$ of said heating operation.

2. The process according to claim 1 in which $$CF_3COCF_3 \cdot 3H_2O$$

is prepared by heating $CF_3COCF_3 \cdot H_2O$.

3. The process according to claim 1 in which $$CF_3COCF_2Cl \cdot 3H_2O$$

is prepared by heating $CF_3COCF_2Cl \cdot H_2O$.

4. The normally solid compound represented by the formula $CF_3COCF_2Cl \cdot H_2O$ having a melting point of about 26.0–26.5° C.

References Cited

UNITED STATES PATENTS 2,617,836  11/1952  Pearlson et al. _____ 260—593.5
2,870,211  1/1959  Miller et al. _____ 260—593.5

DANIEL D. HORWITZ, *Primary Examiner.*